Dec. 28, 1937. C. L. EASTBURG 2,103,979
TRUCK
Filed Feb. 14, 1936 2 Sheets-Sheet 1
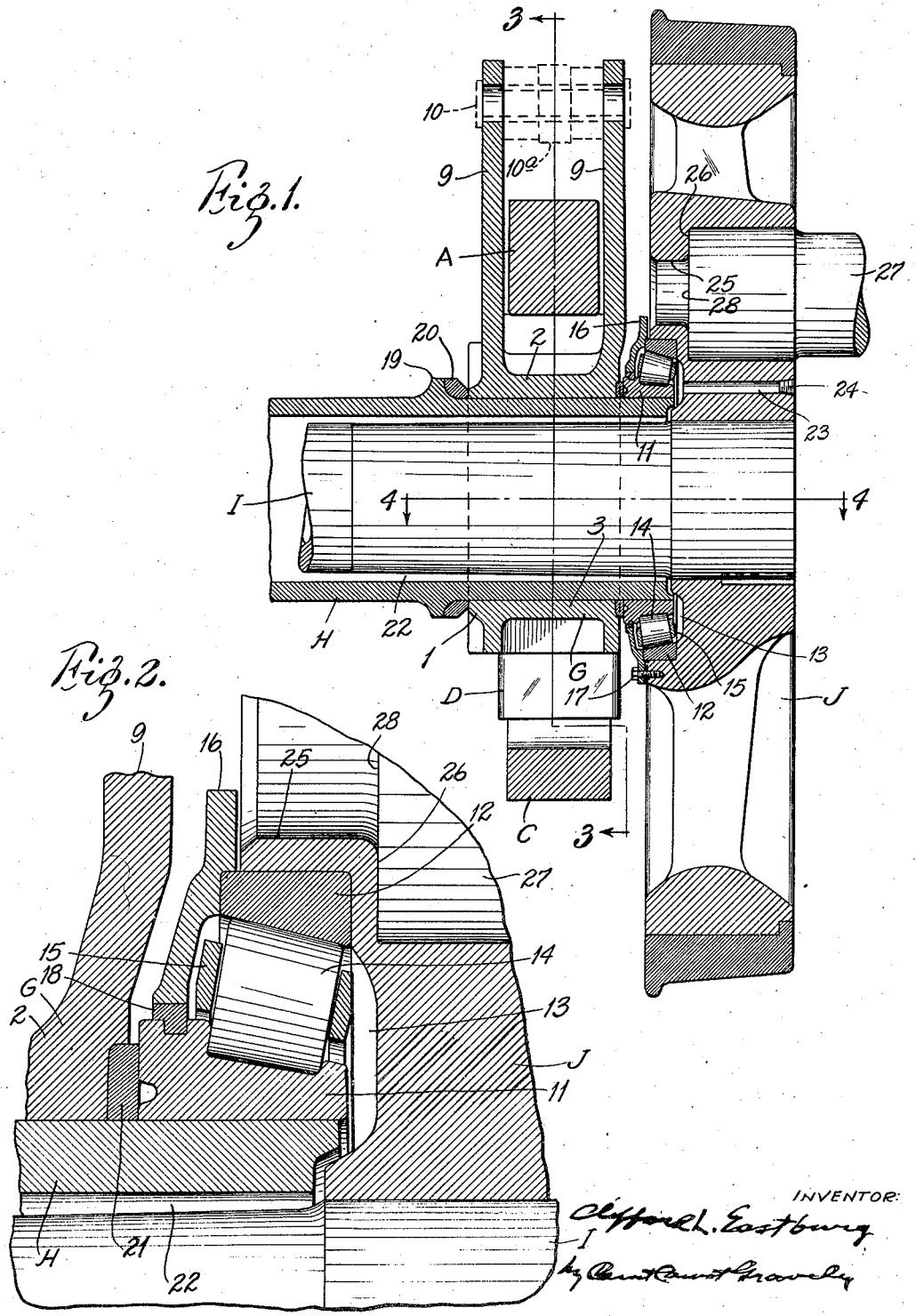

Dec. 28, 1937.　　　C. L. EASTBURG　　　2,103,979
TRUCK
Filed Feb. 14, 1936　　　2 Sheets-Sheet 2

INVENTOR.
Clifford L. Eastburg
by Count Cant Gravely
HIS ATTORNEYS.

Patented Dec. 28, 1937

2,103,979

UNITED STATES PATENT OFFICE 2,103,979

TRUCK

Clifford L. Eastburg, Canton, Ohio, assignor to The Timken Roller Bearing Company, Canton, Ohio, a corporation of Ohio Application February 14, 1936, Serial No. 63,854

7 Claims. (Cl. 105—79)

Figure 3:
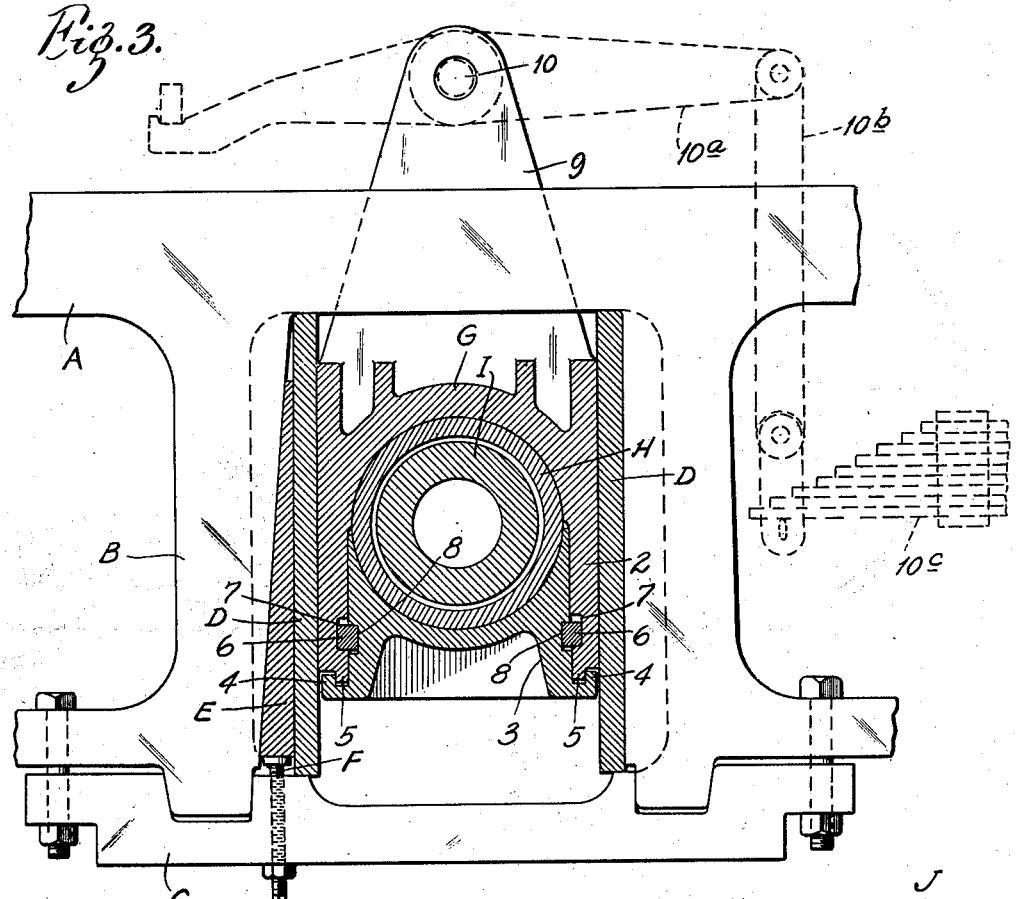
Figure 4:
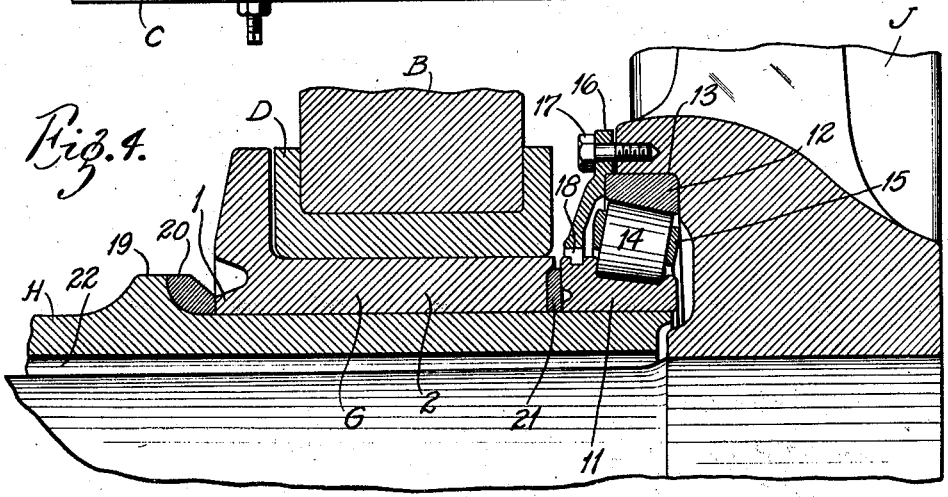

This invention relates to trucks, particularly pedestal trucks of the kind that are used with locomotive and passenger cars and are equipped with roller bearings axle constructions. The invention has for its principal objects to relieve the axle of the weight of the truck and the side thrust thereof, to permit inspection of the roller bearings without removing the wheels from the axle, to provide for adjusting the bearings, to provide for correctly positioning the crank pin axially of the hole provided therefor in the wheel, to provide for simplicity and cheapness of construction and compactness of design, to devise a process of correcting any distortion of the bearing seat in the wheel due to press-fitting the wheel on the axle and the crank pin in the wheel. The invention consists in the roller bearing truck axle construction and in the operations and combinations hereinafter described and claimed. In the accompanying drawings, which form part of this specification and wherein like symbols refer to like parts wherever they occur, Fig. 1 is a vertical section through the pedestal of a locomotive truck and the cooperating end portion of a roller bearing driving axle construction embodying my invention, Fig. 2 is a similar fragmentary section showing the bearing and the parts adjacent thereto on an enlarged scale, Fig. 3 is a vertical section on the line 3—3 in Fig. 1, the truck side frame being shown in side elevation; and Fig. 4 is a fragmentary horizontal section on the line 4—4 in Fig. 1.

In the accompanying drawings, my invention is shown in connection with a locomotive truck having a side frame A provided with a pedestal B, a removable pedestal tie bar or strap C for closing the jaw of the pedestal, channel-shaped frame shoes D that straddle the legs of said pedestal, an adjusting wedge E interposed between one of the pedestal legs and the frame shoe therefor, and an adjusting bolt F for said wedge threaded vertically through said tie bar or strap with its upper end in abutting relation to the lower end of said wedge. Located in the jaw of the truck pedestal B between the vertical frame or guide shoes D thereon is a box G provided at its inner end with outstanding vertical side flanges 1 that are disposed opposite the inner side flanges of said shoes in position to receive the side thrust of the truck. The pedestal or drive box G is mounted on the adjacent end of a tubular load supporting housing H, preferably of cast metal, that surrounds but is spaced from a live axle I that extends beyond the end of said housing and has a wheel J press-fitted on or otherwise rigidly secured to said axle outside of the truck side frame A.

The pedestal box G preferably comprises two vertically separable sections, an upper section 2, which snugly fits the upper half of the axle housing H and includes the frame shoe engaging sides of said box, and a lower section 3 that is slidable vertically between the lower end portions of the frame shoe engaging portions of said upper section and has its upper surface curved to fit the lower half of said axle housing. The lower side corners of the lower pedestal box section 3 are provided with upstanding flanges 4 that overlap depending flanges 5 at the corresponding corners of the upper pedestal box section 2 and serve to prevent spreading of the lower ends of the frame shoe engaging sides thereof.

The two sections of the pedestal box G are drawn together about the axle housing H by means of wedges 6 that work in cooperating grooves 7 and 8 provided therefor in the contacting vertical faces of the respective sections, each wedge engaging the bottom of the groove 7 in the upper section 2 and the top of the groove 8 in the lower section 3, whereby said wedge, when forced longitudinally of the cooperating grooves in the direction of its small end, operates to draw the two sections together about the axle housing. The upper section 2 of the drive box has a pair of upstanding lugs or ears 9 thereon located one on each side of the truck side frame A and provided above said frame with axially alined horizontal apertures adapted to receive and support the ends of a pivot pin 10 for a lever 10a that has a link connection 10b with a spring 10c, said lever, link and spring forming part of the mechanism for equalizing the weight on the truck axles.

Interposed between the wheel and the axle housing is an antifriction bearing, preferably a taper roller bearing comprising a cone or inner raceway member 11 mounted on the end of the axle housing H between the wheel J and the pedestal box G, a tapered cup or outer raceway member 12, which is seated in an annular recess 13 provided therefor in the inner face of said wheel concentric to the axle thereof, and a circular series of tapered bearing rollers 14 assembled in a suitable retaining cage 15 and interposed between said cup and said cone. The annular space between the cone 11 and the cup 12 is closed by means of an annular plate 16, which surrounds the large end of said cone and is removably secured at its outer margin to the inner face of the wheel by a circular series of cap screws 17. The cup 12 extends beyond the recess 13 provided therefor in the wheel; and the end closure plate 16 bears against the projecting end of said cup to hold it against axial movement in said recess. The joint between the end closure plate and the bearing cone is sealed by a device 18 of the piston ring type which seats in an annular groove provided therefor in the large end of said cone.

The axle housing H is provided adjacent to and inwardly of the inner end of the pedestal box F with an exterior thrust rib 19 and an annular spacer element or ring 20 is mounted on said housing between and in abutting relation to said rib and said pedestal box. The sides of the thrust rib or shoulder are radiused so as to thicken the rib at the base thereof and thereby increase the strength of said rib or shoulder in resisting end thrust. Mounted on the axle housing between the opposing ends of the pedestal box G and the bearing cone 11 is a split ring 21 of hardened steel for correctly positioning said cone axially of the bearing cup 12. By using rings of different thicknesses, the bearing cone may be positioned endwise of the axle housing to obtain a proper adjustment of the taper roller bearing.

As shown in the drawings, an annular space 22 is provided between the axle 1 and the housing H therefor which communicates at the end of said housing with the bearing receiving recess 13 in the wheel J, forming a reservoir for lubricant for the roller bearing. Such lubricant is supplied to the reservoir through one or more passageways 23 that extend through said wheel from the outer face thereof to the bearing recess in the inner face thereof and is closed at its outer end by a threaded plug 24. This passageway is disposed in line with the wheel opposing end of the bearing cone 11 for the purpose hereinafter described.

The wheel is also provided with a crank pin hole 25 that extends therethrough from side to side thereof adjacent to the periphery of the cup receiving recess 13 therein and is counterbored to form an annular shoulder 26 therein that faces the outer face of said wheel; and the crank pin 27 has a reduced inner end portion that forms a shoulder 28 adapted to abut against the shoulder in said opening and limit the distance that said pin extends into said opening. The reduced shoulder forming end of the crank pin hole also permits the hole to clear the bearing receiving recess. In the process of assembling the wheel, axle and crank pin, the wheel, with its cup seat and crank pin hole in rough bored condition, is pressed on the axle end, a tire is shrunk on the wheel, the crank pin hole is finished bored to suit accurate quartering, the crank pin is pressed into said hole, and the cup receiving recess is then finished bored concentric to the axle axis to correct any eccentricity due to distortion of said recess resulting from the press-fitting of the wheel on said axle and the crank pin in said hole.

In the arrangement described, the vertical load is transmitted to the wheel through the axle housing and the bearing thereon, thereby relieving the axle of such load. The axle is also relieved of the side thrust of the truck, such thrust being transmitted to the pedestal box whose thrust flange 1 faces the direction thrust, thence through the spacer or thrust ring 20 on the axle housing to the thrust rib or shoulder 19 thereof, thence endwise of the axle housing through the thrust rib, spacer ring, drive box, and adjusting ring 21 on the other end of said axle housing to the bearing thereon and thence through said bearing to the adjacent wheel and through the flange thereof to the rail.

The adjusting ring and the spacer ring serve to prevent relative endwise movement of the axle housing and the pedestal box. By using adjusting rings of different thicknesses, the bearing cone may be positioned endwise of the axle housing to obtain proper adjustment of the bearing. The driving box wedges serve to clamp the two sections of the driving box on the axle housing. The annular closure plate for the bearing receiving recess serves to prevent leakage of oil therefrom and to retain the bearing cup in said recess. The shouldering of the crank pin opening in the wheel provides a stop which prevents the crank pin from being pressed too far into said hole; and it also enables the inner end portion of said hole to clear the periphery of the cup receiving recess in the inner face of said wheel. The finishing boring of said recess after pressing the wheel on the axle and the crank pin in the wheel corrects any distortion of said recess caused by such press-fitting operations.

When it is desired to inspect the bearing, the drive box is dropped from the frame, the wedges removed from said box, the box removed from the axle housing, and the end closure plate removed from the wheel, thereby permitting a partial inspection of the bearing. A more thorough inspection of the bearing can be made by inserting rods through the oil filler passageways 23 in the wheel and driving the cone and roller assembly inwardly along the axle housing clear of the inner face of the wheel.

Obviously, numerous changes may be made without departing from the invention. Therefore, I do not wish to be limited to the precise construction shown.

What I claim is:

1. A truck axle construction comprising an axle, a wheel thereon, an antifriction bearing supported by said wheel, said bearing including an inner raceway member, a housing for said axle having one end fitting in and supported by said inner raceway member, said housing provided with an external thrust shoulder, a pedestal box surrounding said housing between said inner raceway member and said thrust shoulder, and an adjusting ring mounted on said housing between said inner raceway member and said pedestal box, said housing being of substantially uniform diameter between said end thereof and said exterior shoulder.

2. A truck axle construction comprising an axle, a wheel thereon, an anti-friction bearing supported by said wheel, said bearing including an inner raceway member, a housing for said axle having one end fitting in and supported by said inner raceway member, said housing being provided with an external thrust rib, a pedestal box surrounding said housing between said inner raceway member and said thrust rib, an adjusting ring mounted on said housing between said inner raceway member and said ring, and a spacer ring mounted on said housing between said pedestal box and said thrust rib, said housing being of substantially uniform diameter between said end thereof and said exterior shoulder.

3. A truck axle construction comprising an axle, a wheel thereon, said wheel having a circular recess formed in the inner face thereof concentric to the axle axis, an antifriction bearing supported in said recess, a housing for said axle having one end supported in said antifriction bearing, said wheel having a hole extending therethrough adjacent to the periphery of said recess, said hole being shouldered to form a relatively small portion located adjacent to but spaced outwardly from the periphery of said recess and a relatively large portion extending within the projected periphery of said recess but spaced from the bottom of said recess, and a shouldered crank pin extending into said hole with its shoulder abutting against the shoulder thereof.

4. A truck axle construction comprising an axle, a wheel thereon, said wheel having a recess in the inner face thereof concentric to the axle axis, an antifriction bearing supported in said recess, a housing for said axle having one end supported in said antifriction bearing, said wheel having a shouldered hole extending therethrough adjacent to the periphery of the recess therein, and a crank pin fitting in said hole and provided with a reduced end portion forming a shoulder adapted to abut against the shouldered portion of said hole, said recess extending between the shouldered portion of said hole and the inner face of said wheel.

5. The process of assembling the axle, wheel and crank pin of a locomotive driving axle which consists in rough boring a bearing receiving recess in the inner face of the wheel, boring a crank pin hole in said wheel clear of said recess, press-fitting the wheel on the axle, press-fitting the crank pin in said hole and then finish boring said recess concentric to the axle axis to correct any distortion of said recess due to pressing the wheel on the axle and the crank pin in the wheel.

6. The process of assembling the axle, wheel and crank pin of a locomotive driving axle which consists in rough boring a bearing receiving recess in the inner face of the wheel, rough boring a crank pin hole in said wheel adjacent to but clear of said recess, press-fitting the wheel on the axle, finish boring said hole to suit accurate quartering thereof, press-fitting the crank pin in said opening and then finish boring said recess concentric to the axle axis to correct any distortion of said recess due to pressing the wheel on the axle and the crank pin in the wheel.

7. A truck axle construction comprising an axle, a wheel thereon, an antifriction bearing supported by said wheel, said bearing including an inner raceway member, a housing for said axle having one end directly supported in said inner raceway member, said housing having a relatively low radiused thrust shoulder thereon inwardly of said inner raceway member, said housing being of substantially uniform diameter between said end thereof and said thrust shoulder, a pedestal box surrounding said housing between said inner raceway member and said thrust shoulder, and a spacer ring sleeved on said axle housing between the thrust shoulder thereon and said pedestal box, said spacer ring having a radiused end fitting the adjacent radiused side of said thrust shoulder and a flat end adapted to bear flatwise against the adjacent end of said pedestal box.

CLIFFORD L. EASTBURG.